(12) United States Patent
Abe et al.

(10) Patent No.: US 7,564,464 B2
(45) Date of Patent: Jul. 21, 2009

(54) IMAGE FORMING APPARATUS, OPERATION PANEL CONTROL METHOD, AND COMPUTER PRODUCT

(75) Inventors: Yasushi Abe, Tokyo (JP); Takashi Saitoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 405 days.

(21) Appl. No.: 11/147,322

(22) Filed: Jun. 8, 2005

(65) Prior Publication Data

US 2006/0007500 A1 Jan. 12, 2006

(30) Foreign Application Priority Data

Jun. 28, 2004 (JP) ............... 2004-190274

(51) Int. Cl.
*G09G 5/00* (2006.01)
(52) U.S. Cl. .............. 345/581; 358/3.28; 358/474; 358/505; 726/27
(58) Field of Classification Search ........... 348/354; 400/76; 358/1.18, 501; 382/100; 399/80; 726/1–36; 345/581
See application file for complete search history.

(56) References Cited

U.S. PATENT DOCUMENTS

| | | | |
|---|---|---|---|
| 5,999,766 A * | 12/1999 | Hisatomi et al. ........... 399/80 |
| 6,580,806 B1 * | 6/2003 | Sato ........................... 382/100 |
| 6,741,722 B2 | 5/2004 | Abe | |
| 7,058,332 B2 * | 6/2006 | Moroi ......................... 399/80 |
| 2003/0231343 A1 * | 12/2003 | Kobayashi et al. .......... 358/501 |
| 2004/0258277 A1 * | 12/2004 | Ueda .......................... 382/100 |
| 2005/0050331 A1 * | 3/2005 | Skurdal et al. ............. 713/176 |
| 2005/0100378 A1 * | 5/2005 | Kimura et al. ............... 400/76 |
| 2005/0110892 A1 * | 5/2005 | Yun ............................ 348/354 |
| 2005/0186954 A1 * | 8/2005 | Kenney ...................... 455/420 |
| 2005/0248809 A1 * | 11/2005 | Yu ............................. 358/1.18 |

FOREIGN PATENT DOCUMENTS

| | | |
|---|---|---|
| JP | 11-112706 | 4/1999 |
| JP | 2000-115518 | 4/2000 |
| JP | 2001-186326 | 7/2001 |

* cited by examiner

*Primary Examiner*—Xiao M Wu
*Assistant Examiner*—Phi Hoang
(74) *Attorney, Agent, or Firm*—Oblon, Spivak, McClelland, Maier & Neustadt, P.C.

(57) ABSTRACT

In a multifunction product, it is determined whether a detachable expansion board for realizing an electronic watermark function has been mounted. When the expansion board has been mounted, a display concerning the electronic watermark function is automatically displayed on an operation panel of the multifunction product.

6 Claims, 18 Drawing Sheets

FIG.13

SCANNER DISTRIBUTION DESTINATION LIST

| ADDRESS | E-MAIL ADDRESS | ELECTRONIC WATERMARK ON/OFF | ELECTRONIC WATERMARK PARAMETER 1 | ELECTRONIC WATERMARK PARAMETER 1 |
|---|---|---|---|---|
| ABC | abc@xxx.co.jp | ON | P1 | P2 |
| XYZ | xyz@bbb.com | OFF | - | - |
| | | | | |
| | | | | |

FIG.14

SCANNER ACCUMULATED DOCUMENT LIST

| USER NAME | DOCUMENT NAME | ELECTRONIC WATERMARK ON/OFF | ELECTRONIC WATERMARK PARAMETER 1 | ELECTRONIC WATERMARK PARAMETER 1 |
|---|---|---|---|---|
| AAA01 | BROCHURE | ON | P1 | P2 |
| BBB02 | DISTRIBUTION TEXT | OFF | - | - |
| | | | | |
| | | | | |

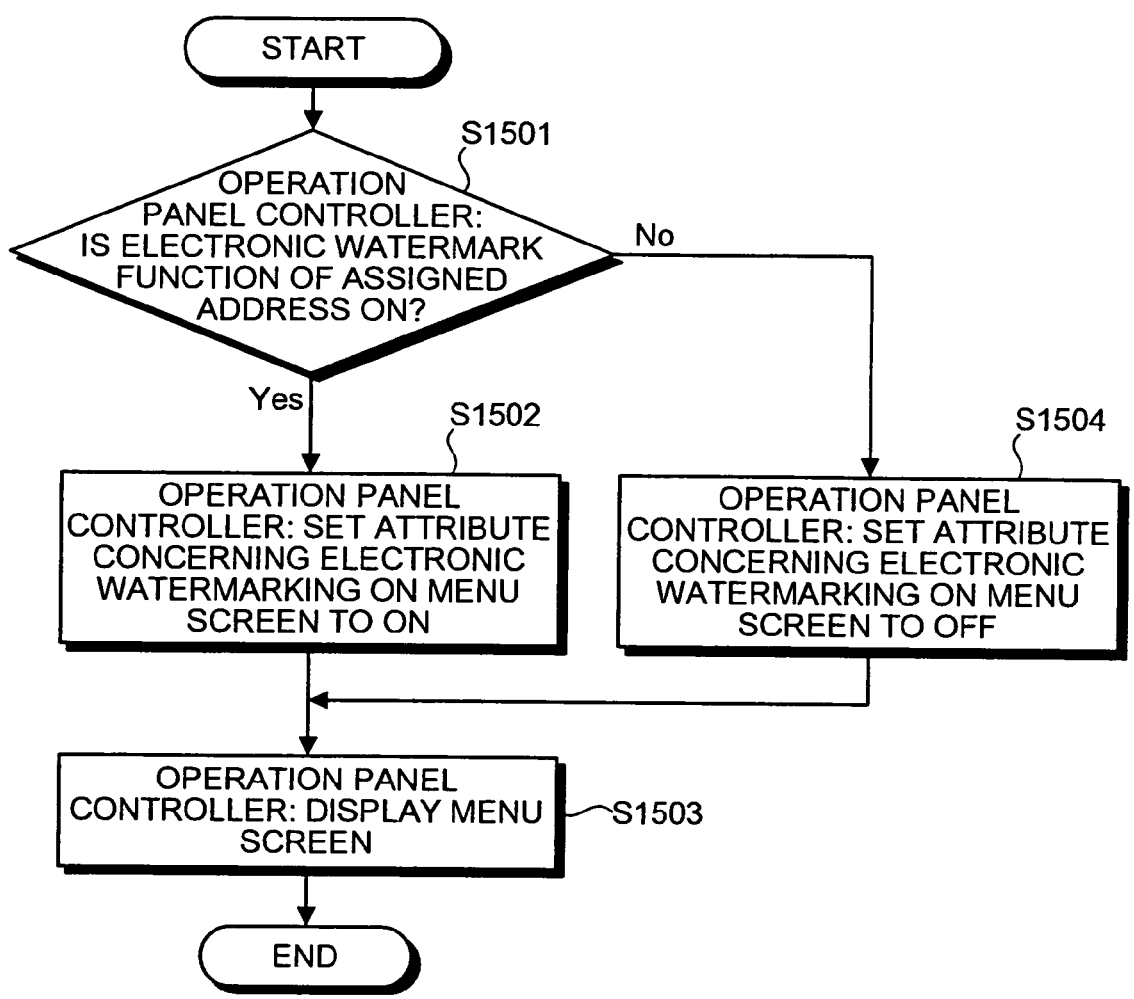

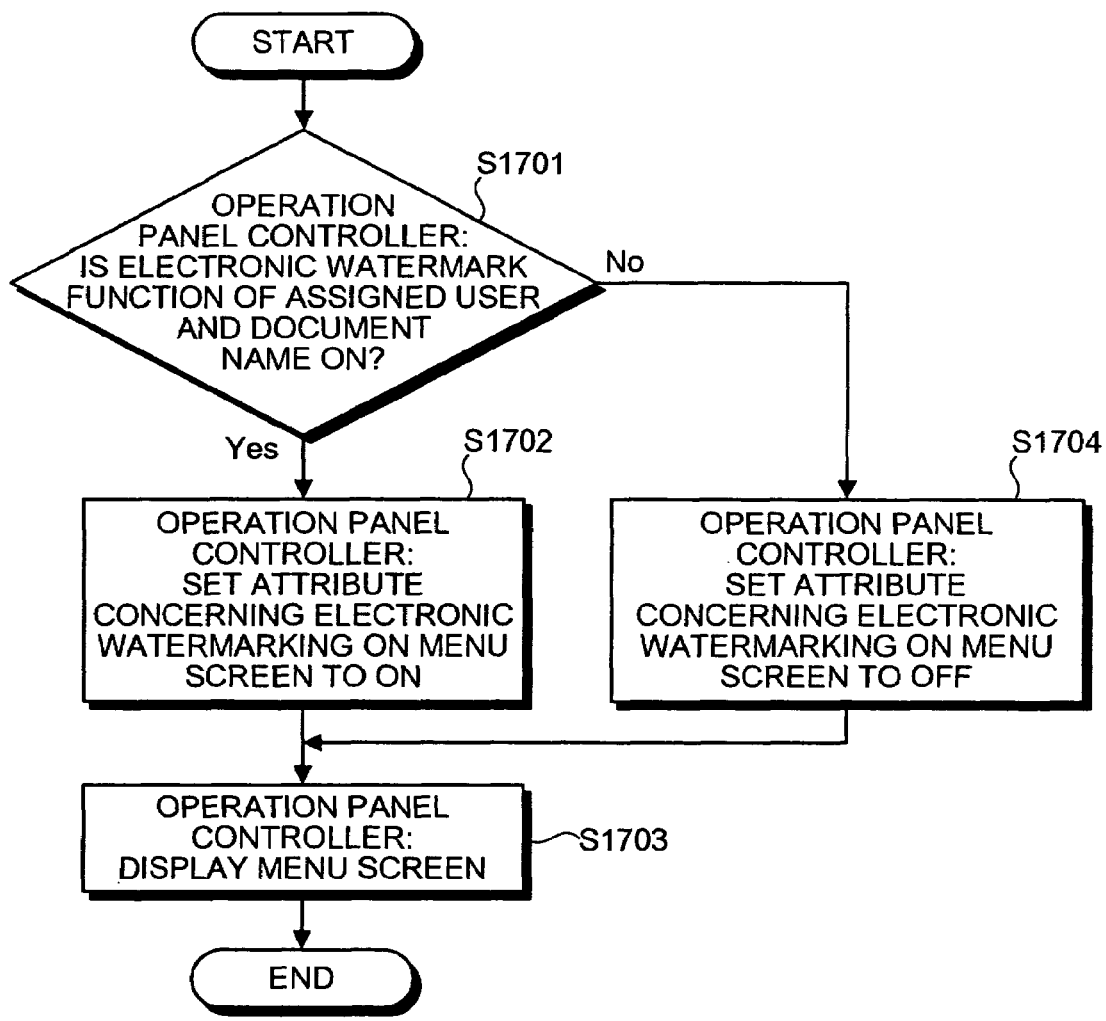

FIG.18A

ACCUMULATED DOCUMENT ASSIGNMENT
1801

| USER NAME | DOCUMENT NAME | DATE |
|---|---|---|
| XYZ | DISTRIBUTION TEXT | 4/2 |
| AAA | BROCHURE | 4/5 |
| | | |
| | | |
| | | |

O K  1802   CANCEL  1803

FIG.18B

ACCUMULATED DOCUMENT

USER NAME: AAA01

ACCUMULATED DOCUMENT: BROCHURE

ACCUMULATED DOCUMENT SUBMENU

ELECTRONIC WATERMARK SETTING

FIG.18C

ACCUMULATED DOCUMENT

USER NAME: BBB02

ACCUMULATED DOCUMENT: DISTRIBUTION TEXT

ACCUMULATED DOCUMENT SUBMENU

FIG.20

USER DB

| USER NAME | PASSWORD | AUTHORITY | NAME |
|---|---|---|---|
| XYY01 | ***** | HIGH | TARO YAMADA |
| ABC | ***** | MEDIUM | ICHIRO SUZUKI |
| DEF02 | ***** | LOW | KEN KOBAYASHI |
| . . . | . . . | . . . | . . . |

IMAGE FORMING APPARATUS, OPERATION PANEL CONTROL METHOD, AND COMPUTER PRODUCT

CROSS-REFERENCE TO RELATED APPLICATIONS

The present document incorporates by reference the entire contents of Japanese priority document, 2004-190274 filed in Japan on Jun. 28, 2004.

BACKGROUND OF THE INVENTION

1) Field of the Invention

The present invention relates to a technology for controlling contents to be displayed on an operation panel of an image forming apparatus.

2) Description of the Related Art

Image processing apparatuses in general and image forming apparatuses that carry out an electronic watermarking of embedding watermark information into a scan-input image to reinforce security of the input image in particular are known in the art.

Japanese Patent Application Laid-Open No. 2000-115518 discloses an image processing apparatus that prepares in advance a table of plural bit patterns corresponding to a bit 1 or a bit 0 based on the frequency of the appearance of a pixel pattern in a local area of image data. This image processing apparatus then embeds information into the image data and restores the embedded information from the image data using this table.

Electronic watermarking is an extended function of basic functions such as scanning and copying. Therefore, a processing program of the extended function is built into a read only memory (ROM) mounted on an expansion board. When using the extended function, this expansion board is mounted on the image processing apparatus.

In the conventional image processing apparatus, the extended function of the security protection, such as the electronic watermarking, is provided as an optional expansion board. Therefore, on an operation panel, when a screen display of the use of only the basic functions of scanning and copying, and a screen display of the use of both the extended function such as the electronic watermarking and the basic function are the same, a user will be confused and cannot determine whether the extended function is currently mounted.

SUMMARY OF THE INVENTION

It is an object of the present invention to at least solve the problems in the conventional technology.

According to an aspect of the present invention, an image forming apparatus that carries out image formation includes an operation panel that enables a user to carry out an input operation, and that carries out a screen display; an expansion board recognizing unit that determines whether a detachable expansion board that realizes a predetermined extended function is mounted on the image forming apparatus; and an operation panel controller that outputs a display concerning the extended function on the operation panel when the expansion board recognizing unit determines that the expansion board is mounted.

According to another aspect of the present invention, an operation panel control method includes determining whether a detachable expansion board that realizes a predetermined extended function is mounted on an image forming apparatus; and outputting a display concerning the extended function to an operation panel for enabling a user to carry out an input operation and for carrying out a screen display when it is determined at the determining that the expansion board is mounted.

According to still another aspect of the present invention, a computer-readable recording medium stores therein a computer program that implements the above method on a computer.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a schematic view of a display example of the main menu screen of the scanner function when an expansion board is mounted and also when an electronic watermark function ON/OFF parameter is ON;

FIG. 5 is a schematic view of a display example of a distribution setting menu screen when the expansion board is mounted and also when the electronic watermark function ON/OFF parameter is ON;

FIG. 10 is a schematic view of a display example of a scanner initialization menu screen when the expansion board is mounted and also when the electronic watermark function ON/OFF parameter is ON;

FIG. 13 is an explanatory diagram of one example of a scanner distribution destination list;

FIG. 14 is an explanatory diagram of one example of a scanner accumulated document list;

FIG. 15 is a flowchart of a sequence of a display control processing of a distribution destination screen when a distribution destination is assigned from a distribution destination setting screen displayed on the operation panel of the multifunction product;

FIG. 16B is a schematic view of a display example of the distribution destination screen when the electronic watermark function ON/OFF parameter is ON;

FIG. 17 is a flowchart of a sequence of a display control processing of an accumulated document screen when an accumulated document is assigned from an accumulated document assignment screen displayed on the operation panel of the multifunction product;

FIG. 18A is a schematic view of a display example of the accumulated document assignment screen;

FIG. 18B is a schematic view of a display example of an accumulated document screen when the electronic watermark function ON/OFF parameter is ON;

FIG. 18C is a schematic view of a display example of the accumulated document screen when the electronic watermark function ON/OFF parameter is OFF;

FIG. 20 is an explanatory diagram of one example of a user database;

DETAILED DESCRIPTION

Exemplary embodiments of the present invention will be explained in detail below with reference to the accompanying drawings. For explanation purpose, the present invention is applied to a multifunction product. A multifunction product is a device that can make copies, print or scan documents, and send facsimile. However, the present invention can be also applied to any device that carries out an image formation processing, such as a copying machine, a facsimile machine, and a scanner.

A multifunction product according to a first embodiment of the present invention controls the screen display to differentiate the display of items of keys and buttons concerning the electronic watermark function on an operation panel depending on whether an expansion board is mounted on the multifunction product or depending on a value of an electronic watermark function ON/OFF parameter.

Figure 1:
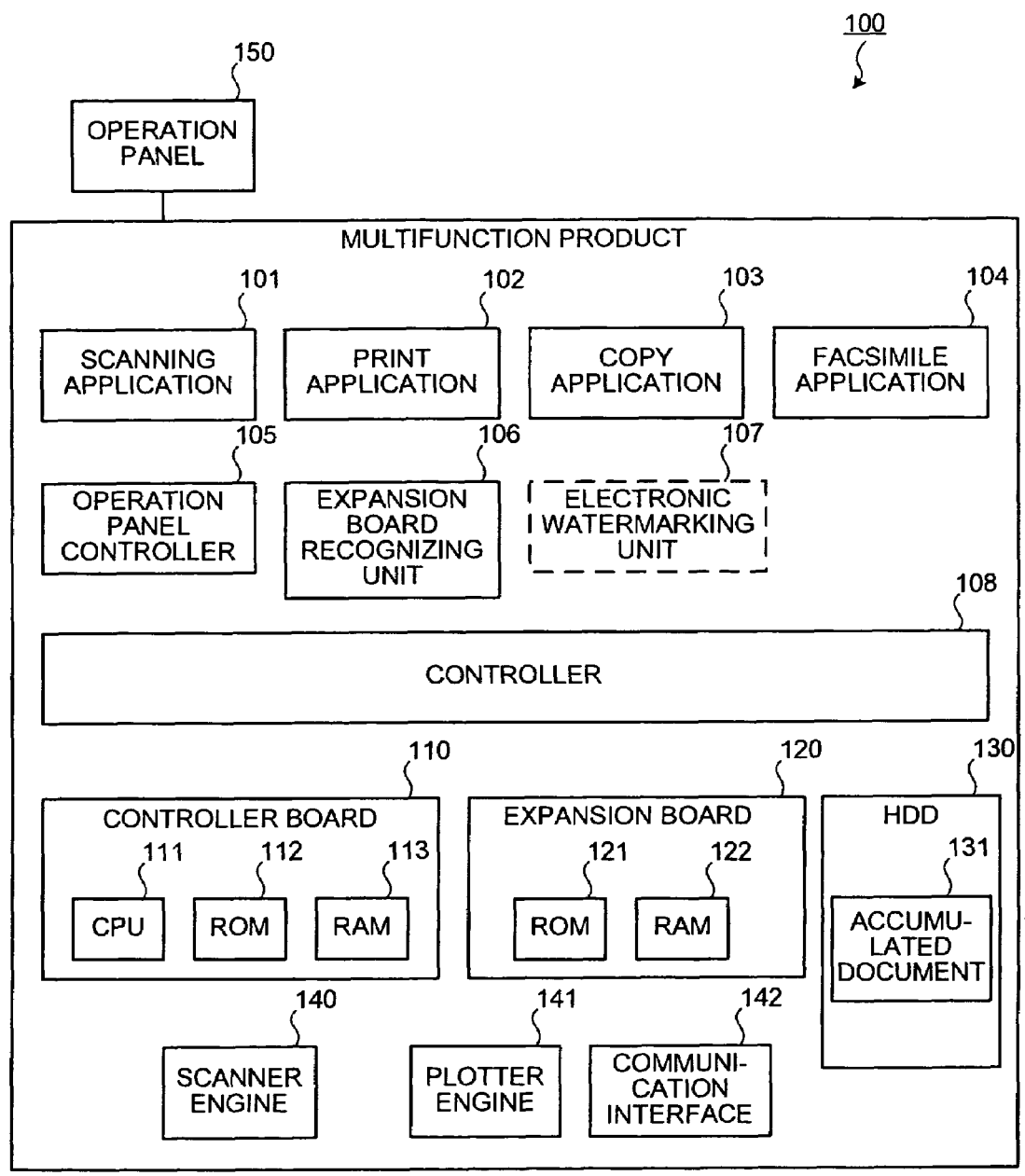
FIG. 1 is a block diagram of a configuration of a multifunction product according to a first embodiment of the present invention.

FIG. 1 is a block diagram of a configuration of the multifunction product 100 according to a first embodiment of the present invention. The multifunction product 100 includes hardware such as an operation panel 150, a controller board 110 mounted with a central processing unit (CPU) 11, a read only memory (ROM) 112, a random access memory (RAM) 113, and the like, an expansion board 120 mounted with a ROM 121, a RAM 122, and the like, a scanner engine 140, a plotter engine 141, a communication interface 142, and a hard disk drive (HDD) unit 130.

The operation panel 150 displays an input screen for a user, and enables the user to input data from the displayed input screen using a displayed operation key. The operation panel 150 includes an operating unit and a display unit. Copy, print, scanner, and facsimile keys are provided on the operating unit. When the user presses any one of these keys, a key event is notified to an operation panel controller 105. A screen corresponding to the pressed key is displayed in the display unit (see FIGS. 3 and 4).

The display unit of the operation panel 150 is a touch-type liquid crystal screen. When the user touches a button or a tag displayed in the display unit, the touched event is notified to the operation panel controller 105, and a processing corresponding to the event is executed.

The controller board 110 is mounted with functions of copy, scan, print, and facsimile as basic functions of the multifunction product 100. Specifically, an image forming program of copy, scan, print, and facsimile, a program of an operating system (OS), and the like are built in the ROM 112. At the time of executing the multifunction product 100, these built-in programs are read from the ROM 112 and are started.

The expansion board 120 is detachably attached to the multifunction product 100. This expansion board 120 realizes an electronic watermarking as the extended function.

The scanner engine 140 is an engine unit that executes a scanning operation. The plotter engine 141 is an engine unit that carries out a print operation. The communication interface 142 is a communicating unit such as a network board. The HDD 130 stores an accumulated document of scan-input images.

The multifunction product 100 includes software such as a scanning application 101, a print application 102, a copy application 103, a facsimile application 104, the operation panel controller 105, an expansion board recognizing unit 106, an electronic watermarking unit 107, and a controller 108.

The scanning application 101 is used to input an image scanned in a scanning condition assigned by the scanner engine 140.

The print application 102 is used to output printed data in a print condition assigned to the plotter engine 141.

The copy application 103 is used to output an image scanned by the scanner engine 140 to the plotter engine 141 in an assigned copy condition.

The facsimile application 104 is used to transmit an image scanned by the scanner engine 140 to an assigned destination and is used to transmit data which is requested to be facsimiled from an external computer via a network, to an assigned destination.

The expansion board recognizing unit 106 determines whether the expansion board 120 is mounted on the multifunction product 100 based on processing such as issuing of a predetermined function.

The operation panel controller 105 controls a display of and an input to the operation panel 150, such as a generation of a screen to be displayed on the operation panel 150 and a receiving of an event of a key input from the operation panel 150. The multifunction product 100 controls the screen display to differentiate the display of items of keys and buttons concerning the electronic watermark function on the operation panel depending on whether the expansion board 120 built-in with a program of the electronic watermark function is mounted on the multifunction product or depending on a value of an electronic watermark function ON/OFF parameter to be explained later.

The electronic watermarking unit 107 embeds watermark information into an input image, and restores an accumulated document 131 into which the watermark information is embedded. The electronic watermarking unit 107 also performs setting concerning the electronic watermarking.

The electronic watermarking unit 107 reads the electronic watermarking program built in the ROM 121 of the expansion board 120 as the extended function, from the ROM 121, and executes this program at the time of starting the multifunction product 100. Therefore, when the expansion board 120 is not mounted in the multifunction product, the electronic watermarking unit 107 is not present.

The controller 108 is an operating system (OS) that carries out an execution control of the program executed on the multifunction product 100.

Other than the electronic watermarking unit 107, each application and each program of each unit as software are built in the ROM 112 of the controller board 110, are read from the ROM 112, and are started at the time of starting the multifunction product 100.

Figure 2:
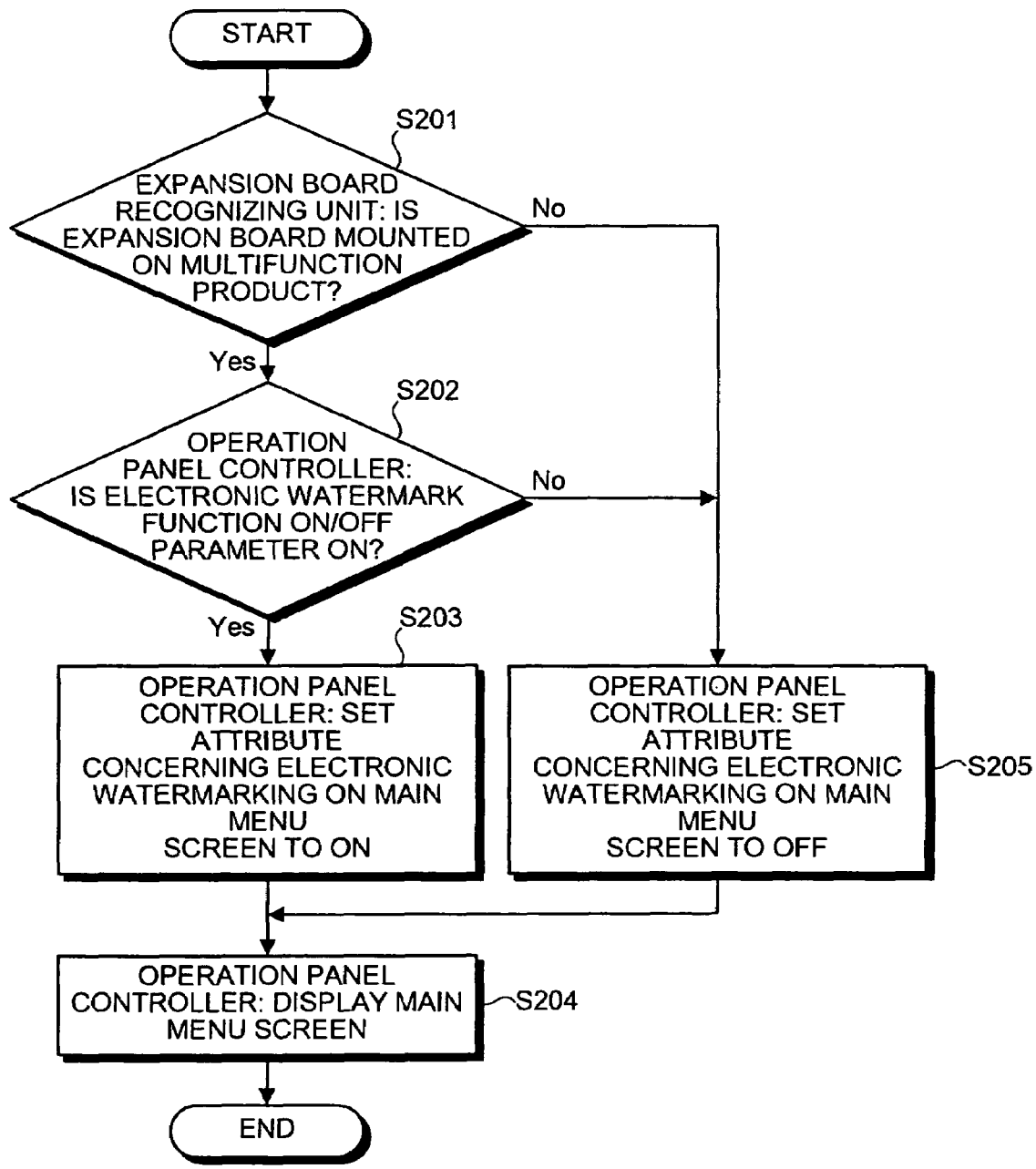
FIG. 2 is a flowchart of a sequence of a screen display control processing performed by the multifunction product shown in FIG. 1.

The screen control processing of the operation panel of the multifunction product 100 is explained below. FIG. 2 is a flowchart of a sequence of a screen display control processing in displaying a main menu screen of the scanner function on the operation panel 150 when a scanner button on the operation panel 150 is operated. First, the expansion board recognizing unit 106 determines whether the expansion board 120 has been mounted (step S201). Whether the expansion board 120 has been mounted can be determined by issuing a system call or a function provided by the OS and by determining from a return value.

When it is determined that the expansion board 120 is not mounted (No at step S201), the attribute of the items of buttons and keys concerning the electronic watermarking on the main menu screen is set to OFF (step S205). When the attribute of the items of buttons and keys is set to OFF, the items of the buttons and the keys are not displayed on the main menu screen.

When it is determined at step S201 that the expansion board 120 is mounted (Yes at step S201), the operation panel controller 105 determines whether the electronic watermark function ON/OFF parameter is ON (step S202). The electronic watermark function ON/OFF parameter corresponds to extended function permission information according to the present invention. The parameter value ON indicates that the electronic watermark function is to be used. The parameter value OFF indicates that the electronic watermark function is not to be used. The user sets the electronic watermark function ON/OFF parameter on an initialization screen. The setting is stored in the RAM 122 of the expansion board 120.

When the electronic watermark function ON/OFF parameter is OFF (No at step S202), the attribute of the items of buttons and keys concerning the electronic watermarking on the main menu screen is set to OFF (step S205).

On the other hand, at step S202, when the electronic watermark function ON/OFF parameter is ON (Yes at step S202), the attribute of the items of buttons and keys concerning the electronic watermarking on the main menu screen is set to ON (step S205). When the attribute of the items of buttons and keys is set to ON, the items of the buttons and keys are displayed on the main menu screen.

The operation panel controller 105 displays a main menu screen of a determined attribute of items concerning the electronic watermark function, on the display unit of the operation panel 150 (step S204).

If the expansion board 120 has been mounted and also when the electronic watermark function ON/OFF parameter is ON, the items of buttons of the electronic watermark function are displayed on the main menu screen. On the other hand, if the expansion board 120 has not been mounted or if the expansion board 120 has been mounted but the electronic watermark function ON/OFF parameter is OFF, the items of buttons of the electronic watermark function are not displayed on the main menu screen.

Figure 3:
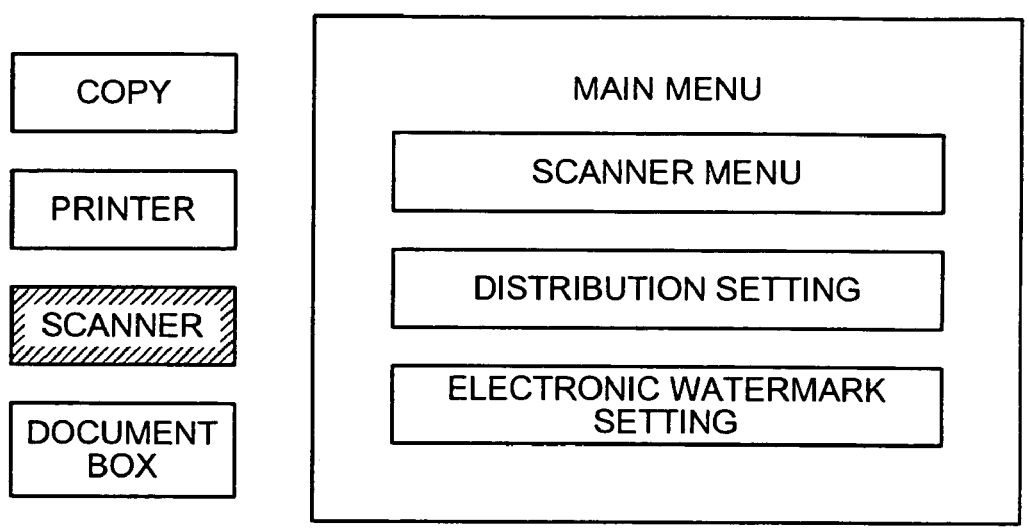
Figure 4:
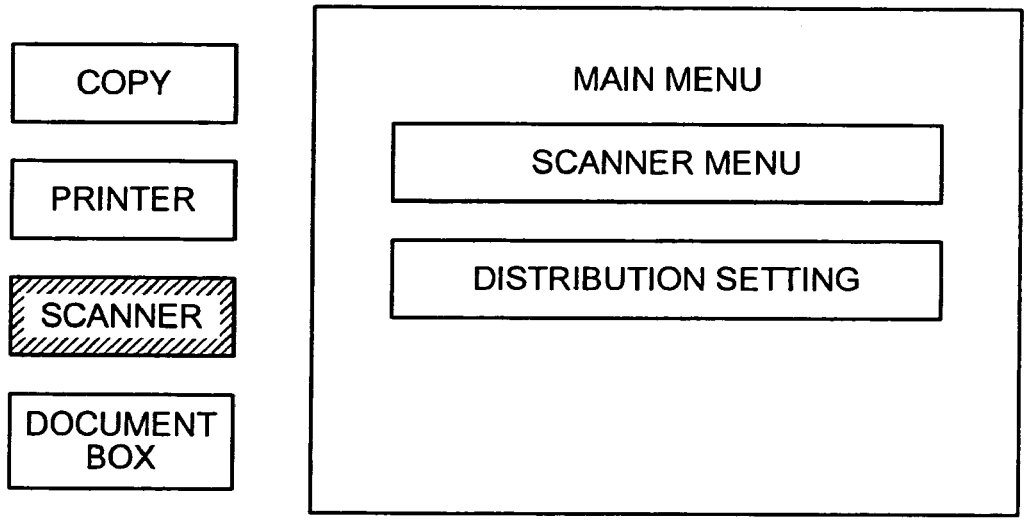
FIG. 4 is a schematic view of a display example of the main menu screen of the scanner function when the expansion board is not mounted or when the expansion board is mounted and the electronic watermark function ON/OFF parameter is OFF.

FIG. 3 is a schematic view of a display example of a main menu screen of the scanner function when the expansion board 120 is mounted and also when the electronic watermark function ON/OFF parameter is ON. FIG. 4 is a schematic view of a display example of the main menu screen of the scanner function when the expansion board 120 is not mounted or when the expansion board 120 is mounted and the electronic watermark function ON/OFF parameter is OFF.

When the expansion board 120 is mounted and also when the electronic watermark function ON/OFF parameter is ON, the attribute of an electronic watermark setting button is set to ON. Therefore, as shown in FIG. 3, the electronic watermark setting button is displayed on the main menu screen of the scanner function displayed by pressing the scanner button. On the other hand, when the expansion board 120 is not mounted or when the expansion board 120 is mounted and the electronic watermark function ON/OFF parameter is OFF, the attribute of the electronic watermark setting button is set to OFF. Therefore, as shown in FIG. 4, the electronic watermark setting button is not displayed on the main menu screen of the scanner function.

When a distribution setting button is touched on the main menu screen shown in FIG. 3 or FIG. 4, a distribution setting menu screen is displayed on the operation panel. In this case, the screen display control processing explained with reference to FIG. 2 is also executed. The display of items of keys and buttons concerning the electronic watermark function is different depending on whether the expansion board 120 is mounted and depending on the value of the electronic watermark function ON/OFF parameter.

Figure 5:
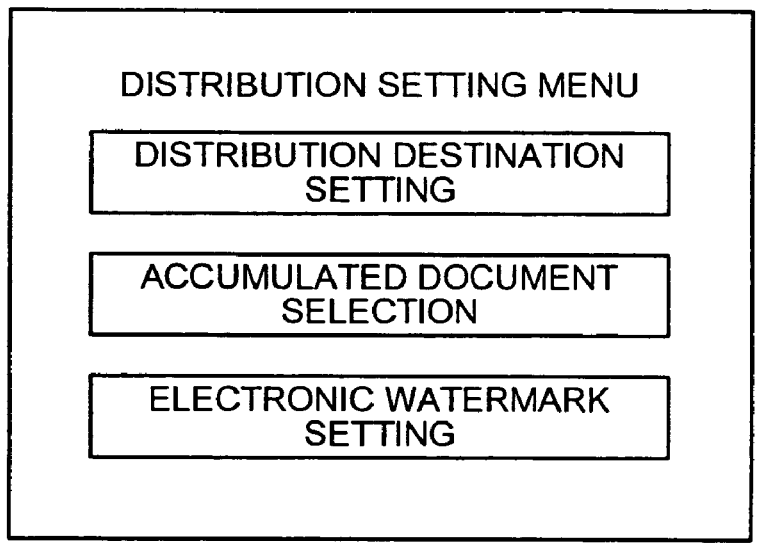
Figure 6:
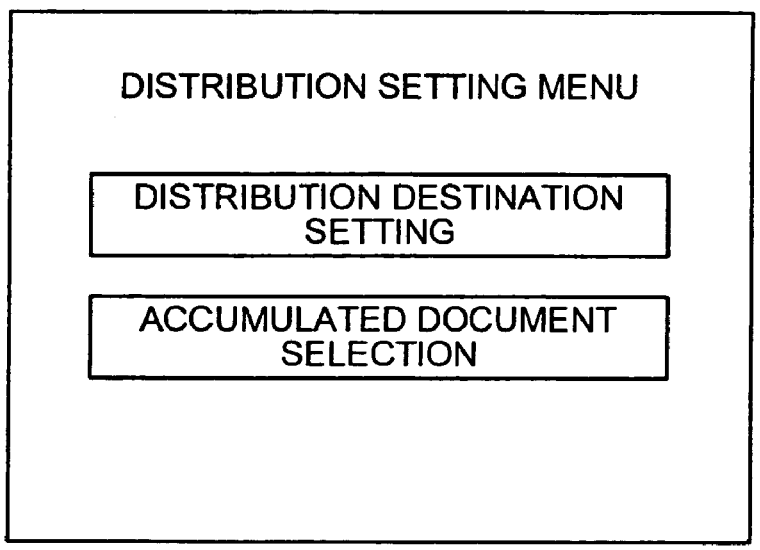
FIG. 6 is a schematic view of a display example of the distribution setting menu screen when the expansion board is not mounted or when the expansion board is mounted and the electronic watermark function ON/OFF parameter is OFF.

FIG. 5 is a schematic view of a display example of a distribution setting menu screen when the expansion board 120 is mounted and also when the electronic watermark function ON/OFF parameter is ON. FIG. 6 is a schematic view of a display example of the distribution setting menu screen when the expansion board 120 is not mounted or when the expansion board 120 is mounted and the electronic watermark function ON/OFF parameter is OFF.

When the expansion board 120 is mounted and also when the electronic watermark function ON/OFF parameter is ON, the attribute of the electronic watermark setting button is set to ON. Therefore, as shown in FIG. 5, the electronic watermark setting button is displayed on the distribution setting menu screen. On the other hand, when the expansion board 120 is not mounted or when the expansion board 120 is mounted and the electronic watermark function ON/OFF parameter is OFF, the attribute of the electronic watermark setting button is set to OFF. Therefore, as shown in FIG. 6, the electronic watermark setting button is not displayed on the distribution setting menu screen.

Figure 7:
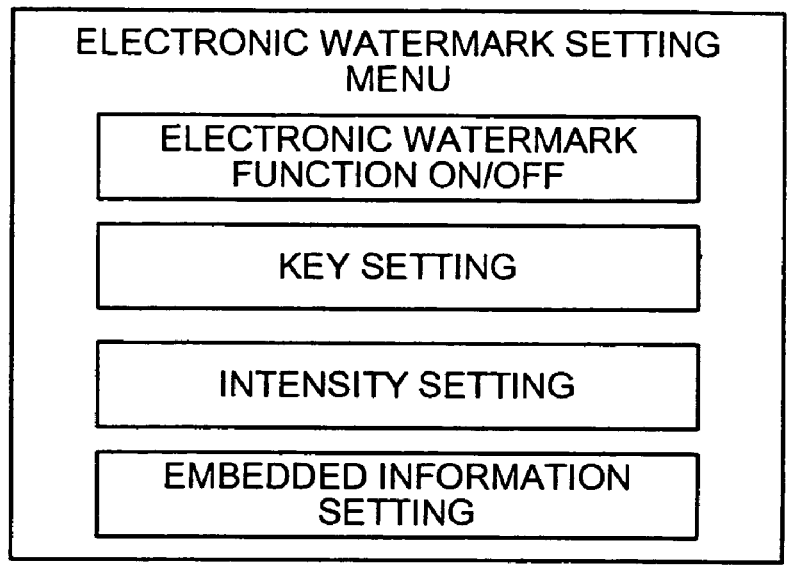
FIG. 7 is a schematic view of a display example of an electronic watermark setting menu screen.

The setting of the electronic watermark function ON/OFF parameter is explained next. When the electronic watermark setting button is touched on the menu screen shown in FIG. 3 or FIG. 5, the electronic watermark setting menu screen is displayed on the operation panel. FIG. 7 is a schematic view of a display example of the electronic watermark setting menu screen.

Submenu buttons for setting parameters of a key and intensity in the electronic watermarking are displayed on the electronic watermark setting menu screen. When an electronic watermark function ON/OFF button is touched on this screen, an electronic watermark function ON/OFF setting screen is displayed.

Figure 8:
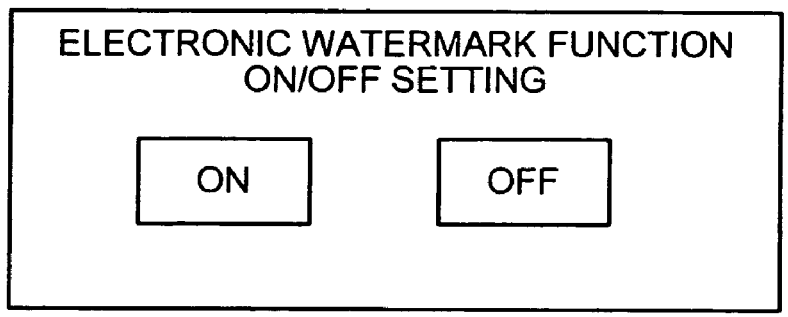
FIG. 8 is a schematic view of a display example of an electronic watermark function ON/OFF setting screen.

FIG. 8 is a schematic view of a display example of the electronic watermark function ON/OFF setting screen. This screen is an input screen for setting the electronic watermark function ON/OFF parameter. When an ON button displayed on the electronic watermark function ON/OFF setting screen is touched, ON is set to the value of the electronic watermark function ON/OFF parameter. When an OFF button displayed on the electronic watermark function ON/OFF setting screen is touched, OFF is set to the value of the electronic watermark function ON/OFF parameter. The set value is stored in the RAM 122.

Figure 9:
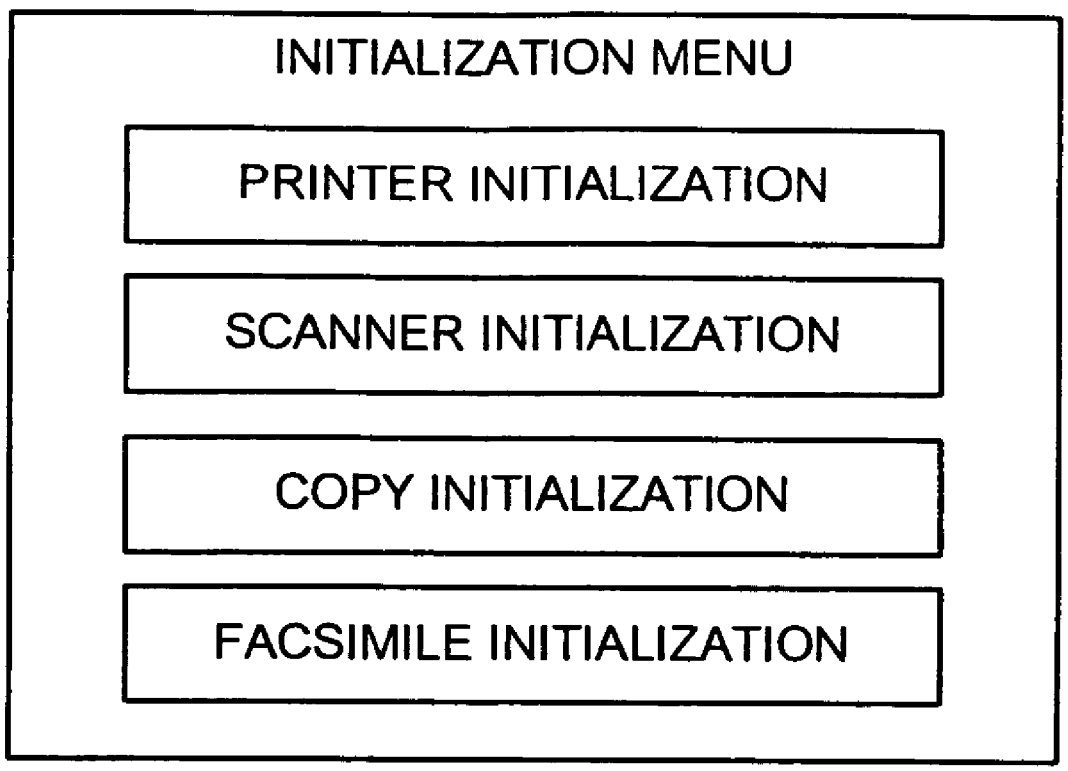
FIG. 9 is a schematic view of a display example of an initialization menu.

A display control processing of an initialization menu screen is explained next. When an initialization button is touched on a system menu (not shown) the initialization menu is displayed on the operation panel 150. FIG. 9 is a schematic view of a display example of the initialization menu.

As shown in FIG. 9, buttons for displaying submenus of printer initialization, scanner initialization, copy initialization, and facsimile initialization are displayed on the initialization menu screen. When the scanner initialization button is touched on this screen, a scanner initialization menu screen is displayed on the operation panel 150. In this case, the screen display control processing explained with reference to FIG. 2 is also executed. The display of items of keys and buttons concerning the electronic watermark function is different depending on whether the expansion board 120 is mounted and depending on the value of the electronic watermark function ON/OFF parameter.

Figure 10:
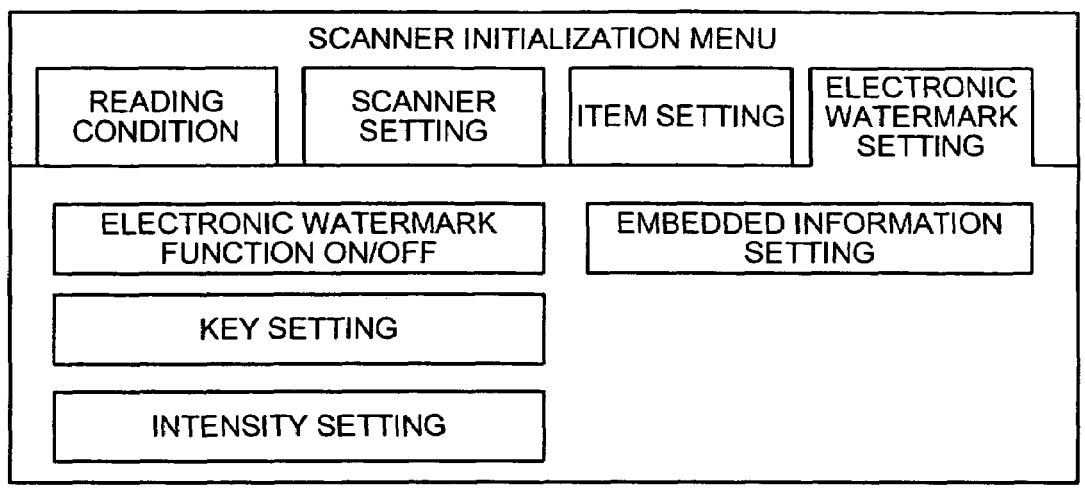
Figure 11:
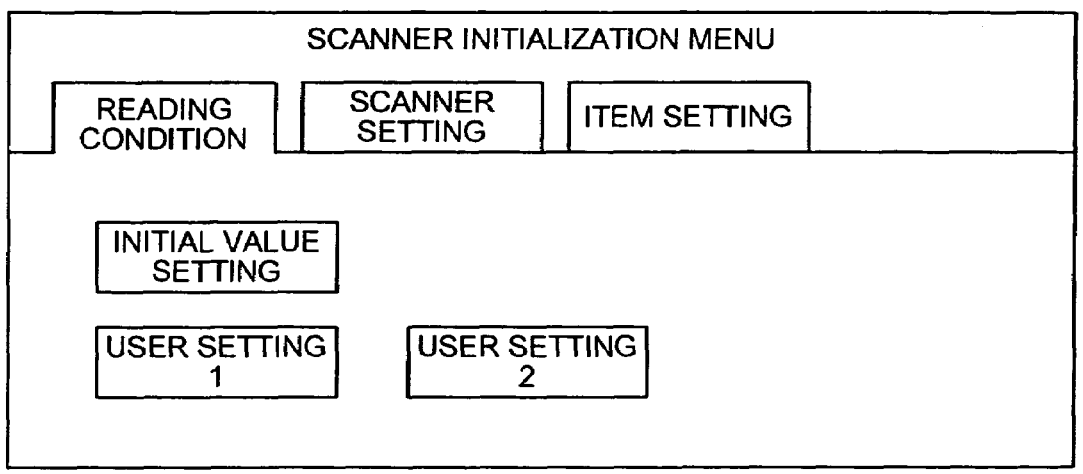
FIG. 11 is a schematic view of a display example of the scanner initialization menu screen when the expansion board is not mounted or when the expansion board is mounted and the electronic watermark function ON/OFF parameter is OFF.

FIG. 10 is a schematic view of a display example of the scanner initialization menu screen when the expansion board 120 is mounted and also when the electronic watermark function ON/OFF parameter is ON. FIG. 11 is a schematic view of a display example of the scanner initialization menu screen when the expansion board 120 is not mounted or when the expansion board 120 is mounted and the electronic watermark function ON/OFF parameter is OFF.

When the expansion board 120 is mounted and also when the electronic watermark function ON/OFF parameter is ON, the attribute of an electronic watermark setting tag is set to ON. Therefore, as shown in FIG. 10, the electronic watermark setting tag and a button in the setting tag are displayed on the scanner initialization menu screen. On the other hand, when the expansion board 120 is not mounted or when the expansion board 120 is mounted and the electronic watermark function ON/OFF parameter is OFF, the attribute of the electronic watermark setting tag is set to OFF. Therefore, as shown in FIG. 11, the electronic watermark setting tag is not displayed on the scanner initialization menu screen.

As explained above, the multifunction product 100 controls the screen display to differentiate the display of items of keys and buttons concerning the electronic watermark function on the operation panel depending on whether the expansion board 120 has been mounted on the multifunction product or depending on a value of the electronic watermark function ON/OFF parameter. Therefore, the operability of the user in using the electronic watermark can be improved.

In a second embodiment of the present invention, a multifunction product sets the electronic watermark function ON/OFF parameter for each distribution destination and for each accumulated document. The multifunction product controls the screen display to differentiate the display of items of keys and buttons concerning the electronic watermark function on the operation panel for each distribution destination and for each accumulated document.

Figure 12:
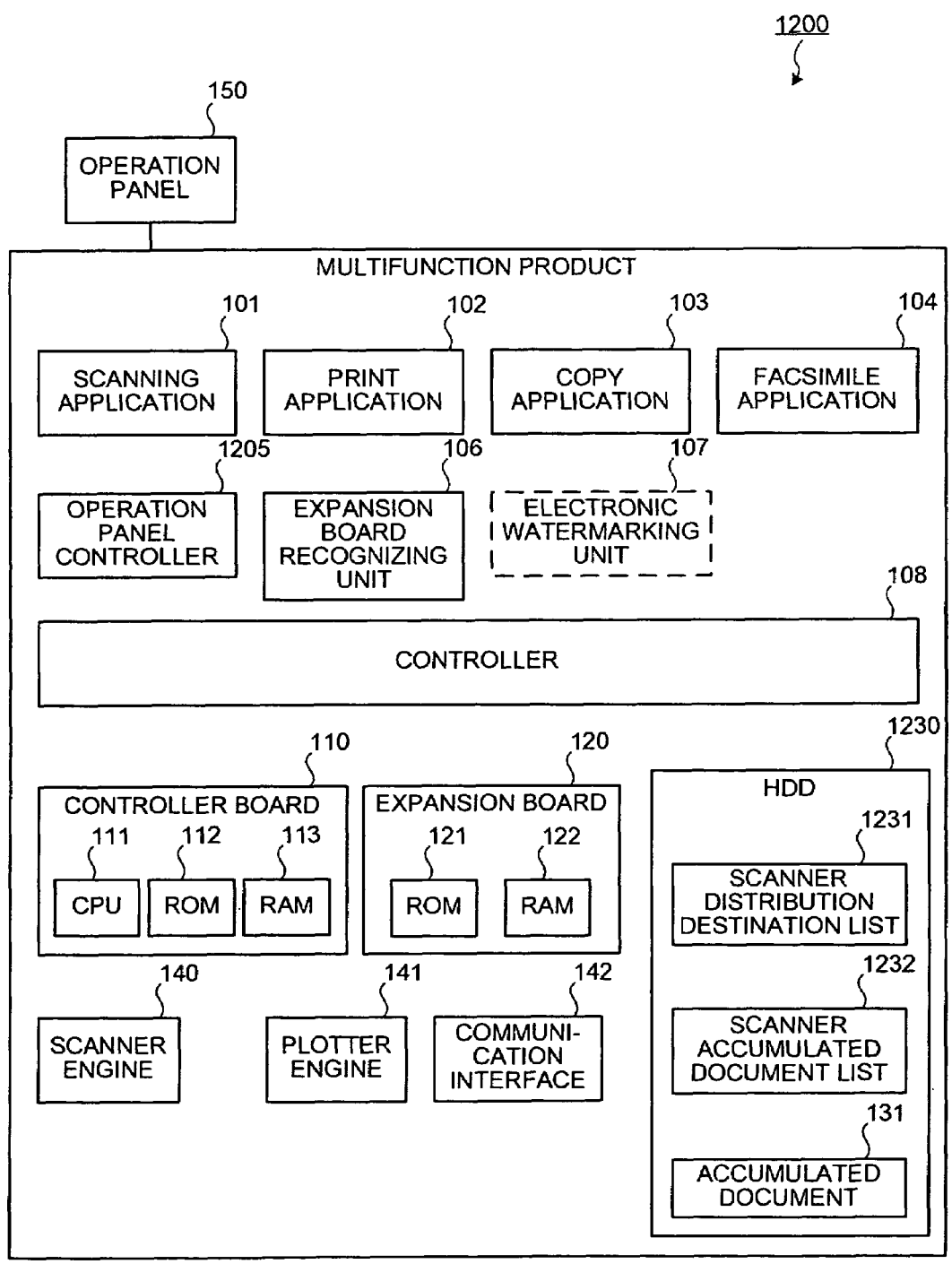
FIG. 12 is a block diagram of a configuration of a multifunction product according to a second embodiment of the present invention.

FIG. 12 is a block diagram of a configuration of a multifunction product 1200 according to the second embodiment. The multifunction product 1200 according to the present embodiment includes hardware such as the operation panel 150, the controller board 110 mounted with the CPU 11, the ROM 112, the RAM 113, and the like, the expansion board 120 mounted with the ROM 121, the RAM 122, and the like, the scanner engine 140, the plotter engine 141, the communication interface 142, and an HDD 1230.

The HDD 1230 stores the accumulated document 131 of scan-input images, a scanner distribution destination list 1231, and a scanner accumulated document list 1232. Other hardware configurations and functions are similar to those of the multifunction product 100 according to the first embodiment.

The multifunction product 1200 includes software such as the scanning application 101, the print application 102, the copy application 103, the facsimile application 104, an operation panel controller 1205, the expansion board recognizing unit 106, the electronic watermarking unit 107, and the controller 108.

The operation panel controller 1205 controls a display of and an input to the operation panel 150, such as a generation of a screen to be displayed on the operation panel 150 and a receiving of an event of a key input from the operation panel 150. In the multifunction product 1200 according to the present embodiment, the operation panel controller 1205 controls the screen display to differentiate the display of items of keys and buttons concerning the electronic watermark function on the operation panel depending on whether the expansion board 120 built-in with a program of the electronic watermark function is mounted on the multifunction product or depending on a value of an electronic watermark function ON/OFF parameter to be explained later. Further, the multifunction product 1200 sets the electronic watermark function ON/OFF parameter for each distribution destination and for each accumulated document, and controls the screen display to differentiate the display of items of keys and buttons concerning the electronic watermark function on the operation panel for each distribution destination and for each accumulated document. Other hardware configurations and functions are similar to those of the multifunction product 100 according to the first embodiment.

The scanner distribution destination list 1231 stored in the HDD 1230 is explained next. The scanner distribution destination list 1231 is a table of data showing a distribution destination of scan-input images, various kinds of information, and data concerning electronic watermarking. FIG. 13 is an explanatory diagram of one example of the scanner distribution destination list 1231. As shown in FIG. 13, the scanner distribution destination list 1231 shows an e-mail address, an electronic watermark function ON/OFF parameter, and electronic watermark parameters, corresponding to each address of a distribution destination.

The electronic watermark function ON/OFF parameter indicates whether the electronic watermark function is to be used, like the electronic watermark function ON/OFF parameter according to the first embodiment (ON indicates that the electronic watermark function is to be used, and OFF indicates that the electronic watermark function is not to be used).

An electronic watermark parameter 1 and an electronic watermark parameter 2 are used by the electronic watermarking unit 107 to embed watermark information into an image and to restore the watermark information.

Since the electronic watermark function ON/OFF parameter is determined for each destination of a distribution destination as described above, it is possible to determine whether the electronic watermark is to be embedded for each distribution destination of a scan image.

The scanner accumulated document list 1232 stored in the HDD 1230 is explained next. The scanner accumulated document list 1232 is a table of the accumulated document 131 in which scan-input images are stored. FIG. 14 is an explanatory diagram of one example of the scanner accumulated document list 1232. The scanner accumulated document list 1232 includes a document name of an accumulated document, the electronic watermark function ON/OFF parameter, and the electronic watermark parameters, corresponding to each user name.

The user name is a name of an owner or a creator of the accumulated document 131. The electronic watermark function ON/OFF parameter indicates whether the electronic watermark function is to be used (ON indicates that the electronic watermark function is to be used, and OFF indicates that the electronic watermark function is not to be used).

The electronic watermark parameter 1 and the electronic watermark parameter 2 are used by the electronic watermarking unit 107 to embed watermark information into an image and to restore the watermark information.

Since the electronic watermark function ON/OFF parameter is determined for each document name as described above, it is possible to determine whether the electronic watermark is to be embedded for each accumulated document of a scan image.

The screen control processing of the operation panel by the multifunction product 1200 is explained next. Like the multifunction product according to the first embodiment, the multifunction product 1200 according to the present embodiment controls the screen display of the main menu screen and the initialization screen to differentiate the display of items of keys and buttons concerning the electronic watermark function on the operation panel depending on whether the expansion board 120 is mounted on the multifunction product or depending on a value of the electronic watermark function ON/OFF parameter.

In the second embodiment, the following other screen display control is carried out. When the user touches a distribution destination setting button of a distribution setting menu shown in FIG. 5, a distribution destination setting screen is displayed.

FIG. 15 is a flowchart of a sequence of the display control processing of the distribution destination screen when a distribution destination is assigned from the distribution destination setting screen displayed on the operation panel 150 of the multifunction product 1200.

Figure 16A:
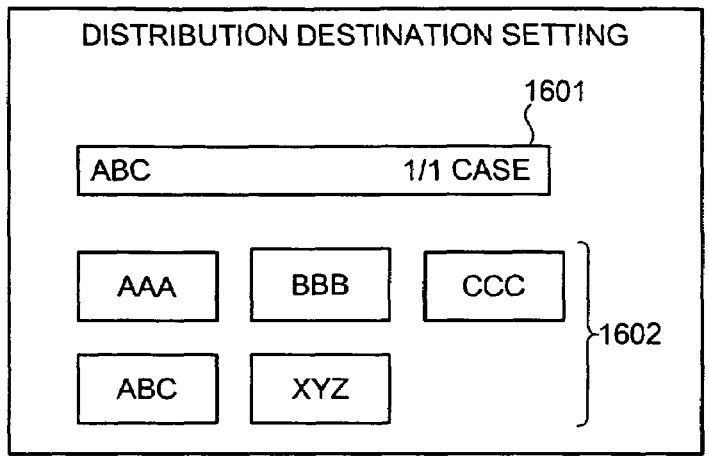
FIG. 16A is a schematic view of a display example of the distribution destination setting screen.

The distribution destination setting screen is used to select a distribution destination of a scan-input image from among plural distribution destinations. FIG. 16A is a schematic view of a display example of the distribution destination setting screen. As shown in FIG. 16A, plural distribution destination buttons are displayed on the distribution destination setting screen. When the user touch-inputs an address of a selected distribution destination, this address is displayed in a display column 1601.

When an optional distribution destination button is touched on the distribution destination setting screen, the operation panel controller 1205 refers to the scanner distribution destination list 1231, and determines whether the electronic watermark function ON/OFF parameter of the address of the distribution destination selected by the touch operation is ON (step S1501).

When the electronic watermark function ON/OFF parameter is OFF (No at step S1501), the operation panel controller 1205 sets the attribute of the items of buttons and keys concerning the electronic watermark on the distribution destination screen, to OFF (step S1504).

On the other hand, when the electronic watermark function ON/OFF parameter is ON at step S1501 (Yes at step S1501), the operation panel controller 1205 sets the attribute of the items of buttons and keys concerning the electronic watermark on the distribution destination screen, to ON (step S1502).

The operation panel controller 1205 displays a distribution destination screen in which the attribute of the items concerning the electronic watermark function is determined, in the display unit of the operation panel 150 (step S1503).

When the electronic watermark function ON/OFF parameter is ON, the items of buttons of the electronic watermark function are displayed on the distribution destination screen. On the other hand, when the electronic watermark function ON/OFF parameter is OFF, the items of buttons of the electronic watermark function are not displayed on the distribution destination screen.

Figure 16B:
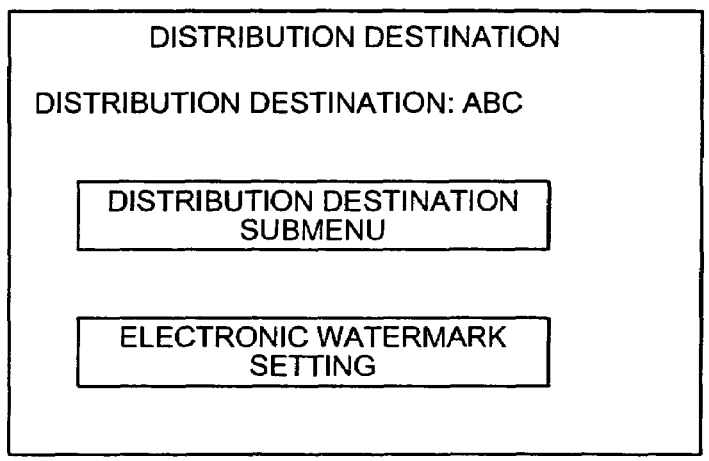
Figure 16C:
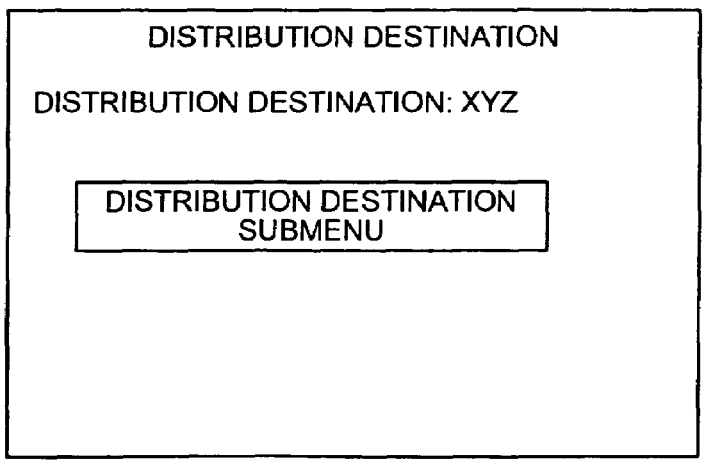
FIG. 16C is a schematic view of a display example of the distribution destination screen when the electronic watermark function ON/OFF parameter is OFF.

FIG. 16B is a schematic view of a display example of the distribution destination screen when the electronic watermark function ON/OFF parameter is ON. FIG. 16C is a schematic view of a display example of the distribution destination screen when the electronic watermark function ON/OFF parameter is OFF.

When the electronic watermark function ON/OFF parameter is ON, the attribute of the electronic watermark setting button is set to ON. Therefore, the electronic watermark setting button is displayed on the distribution destination screen, as shown in FIG. 16B. On the other hand, when the electronic watermark function ON/OFF parameter is OFF, the attribute of the electronic watermark setting button is set to OFF. Therefore, the electronic watermark setting button is not displayed on the distribution destination screen, as shown in FIG. 16C.

The multifunction product 1200 according to the present embodiment displays an accumulated document assignment screen, when the user touches an accumulated document selection button of the distribution setting menu shown in FIG. 5.

FIG. 17 is a flowchart of a sequence of the display control processing of the accumulated document screen when the accumulated document is assigned from the accumulated document assignment screen displayed on the operation panel 150 of the multifunction product 1200.

The accumulated document assignment screen is used to select an accumulated document to be distributed from among the plural scan-input accumulated documents 131 stored in the HDD 1230. FIG. 18A is a schematic view of a display example of the accumulated document assignment screen. As shown in FIG. 18A, the accumulated document assignment screen displays a list of the accumulated documents 131 stored in the HDD 1230, in a list column 1801. When the user selects the accumulated document 131 by touching the list column 1801 and also when the user touch-inputs an OK button 1802, the operation panel controller 1205 to which this event is notified refers to the scanner accumulated document list 1232, and determines whether the electronic watermark function ON/OFF parameter of the user name and the document name of the accumulated document selected by the touch operation is ON (step S1701).

When the electronic watermark function ON/OFF parameter is OFF (No at step S1701), the attribute of buttons and keys concerning the electronic watermark of the accumulated document screen is set to OFF (step S1704).

On the other hand, when the electronic watermark function ON/OFF parameter is ON at step S1701 (Yes at step S1701), the attribute of buttons and keys concerning the electronic watermark of the accumulated document screen is set to ON (step S1702).

The operation panel controller 1205 displays the accumulated document screen in which the attribute of the items concerning the electronic watermark function is determined, in the display unit of the operation panel 150 (step S1703).

When the electronic watermark function ON/OFF parameter is ON, the items of buttons of the electronic watermark function are displayed on the accumulated document screen. On the other hand, when the electronic watermark function ON/OFF parameter is OFF, the items of buttons of the electronic watermark function are not displayed on the accumulated document screen.

FIG. 18B is a schematic view of a display example of the accumulated document screen when the electronic watermark function ON/OFF parameter is ON. FIG. 18C is a schematic view of a display example of the accumulated document screen when the electronic watermark function ON/OFF parameter is OFF.

When the electronic watermark function ON/OFF parameter of the accumulated document assigned by the user name and the document name is ON, the attribute of the electronic watermark setting button is set to ON. Therefore, the electronic watermark setting button is displayed on the accumulated document screen, as shown in FIG. 18B. On the other hand, when the electronic watermark function ON/OFF parameter is OFF, the attribute of the electronic watermark setting button is set to OFF. Therefore, the electronic watermark setting button is not displayed on the accumulated document screen, as shown in FIG. 18C.

As explained above, the multifunction product 1200 displays the distribution setting screen to enable the user to assign the distribution destination, on the operation panel 150. When the electronic watermark function ON/OFF parameter is set to ON for the scanner distribution destination list 1231 corresponding to the distribution destination assigned from the distribution setting screen, the multifunction product 1200 outputs a button concerning the electronic watermark function setting, to the operation panel. Therefore, it is possible to determine whether the electronic watermark function is to be used for each distribution destination of the scan-input image. Consequently, the electronic watermark function has diversity.

The multifunction product 1200 according to the second embodiment displays the accumulated document assignment screen to enable the user to assign the accumulated document stored in the HDD 1230, on the operation panel. When the electronic watermark function ON/OFF parameter is set to ON for the scanner accumulated document list corresponding to the accumulated document assigned from the accumulated document assignment screen, the multifunction product 1200 outputs a button concerning the electronic watermark function setting, to the operation panel. Therefore, it is possible to determine whether the electronic watermark function is to be used for each accumulated document. Consequently, the electronic watermark function has diversity.

In a third embodiment of the present invention, a multifunction product controls the screen display to differentiate the display of items of keys and buttons concerning the electronic watermark function for each user who uses the multifunction product.

Figure 19:
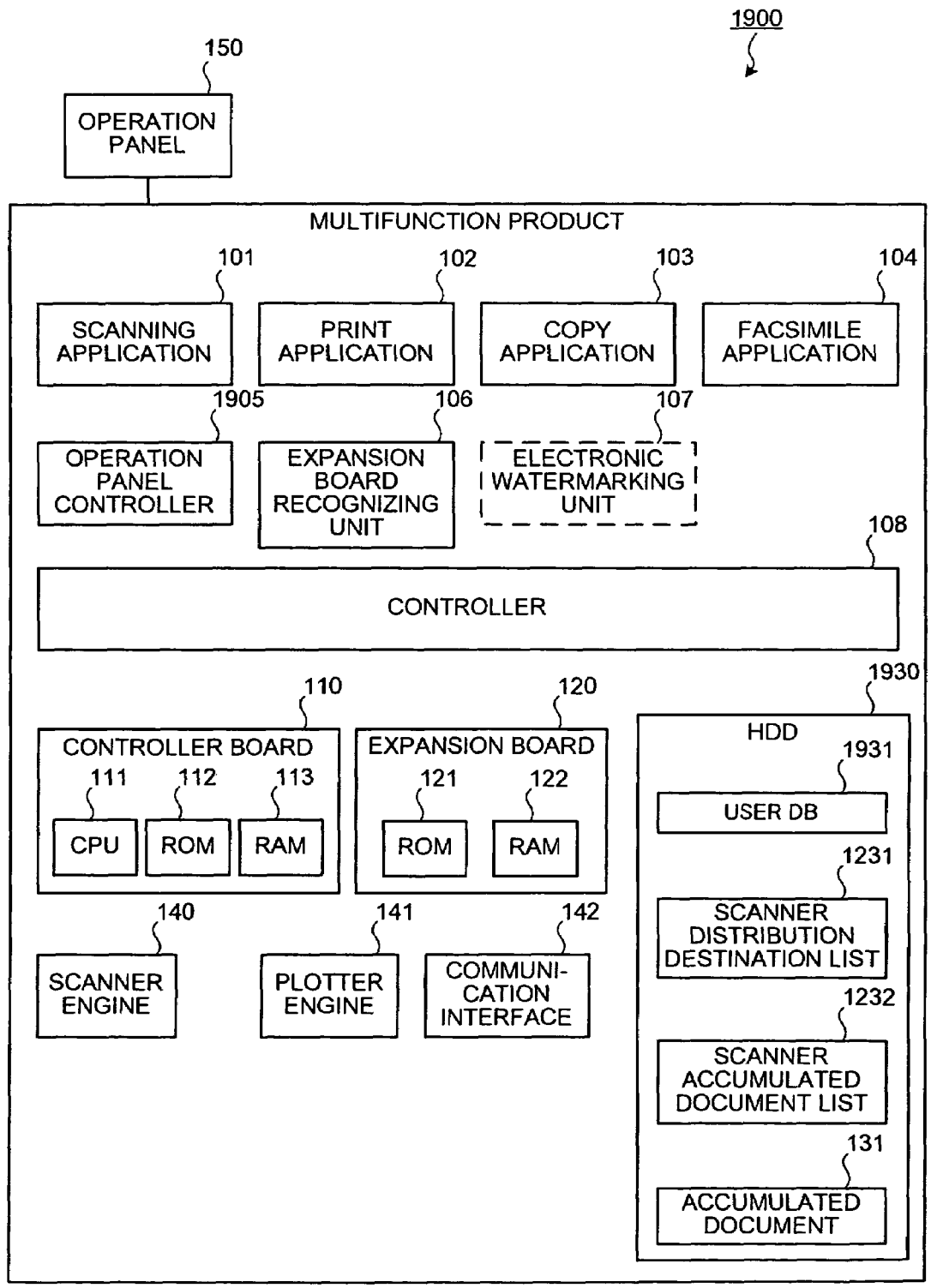
FIG. 19 is a block diagram of a configuration of a multifunction product according to a third embodiment of the present invention.

FIG. 19 is a block diagram of a configuration of a multifunction product 1900 according to the third embodiment. As shown in FIG. 19, the multifunction product 1900 includes hardware such as the operation panel 150, the controller board 110 mounted with the CPU 11, the ROM 112, the RAM 113, and the like, the expansion board 120 mounted with the ROM 121, the RAM 122, and the like, the scanner engine 140, the plotter engine 141, the communication interface 142, and an HDD 1930.

The HDD 1930 stores the accumulated document 131 of scan-input images, the scanner distribution destination list 1231, and the scanner accumulated document list 1232 explained in the second embodiment. The HDD 1930 further includes a user database (DB) 1931. Other hardware configurations and functions are similar to those of the multifunction product 100 according to the first embodiment.

The multifunction product 1900 includes software such as the scanning application 101, the print application 102, the copy application 103, the facsimile application 104, an operation panel controller 1905, the expansion board recognizing unit 106, the electronic watermarking unit 107, and the controller 108.

The operation panel controller 1905 controls a display of and an input to the operation panel 150, such as a generation of a screen to be displayed on the operation panel 150 and a receiving of an event of a key input from the operation panel 150. In the multifunction product 1900 according to the present embodiment, the operation panel controller 1905 controls the screen display to differentiate the display of items of keys and buttons concerning the electronic watermark function on the operation panel depending on whether the expansion board 120 built-in with a program of the electronic watermark function is mounted on the multifunction product or depending on a value of an electronic watermark function ON/OFF parameter to be explained later.

The operation panel controller 1905 sets the electronic watermark function ON/OFF parameter for each distribution destination and for each accumulated document, and controls the screen display to differentiate the display of items of keys and buttons concerning the electronic watermark function for each distribution destination and for each accumulated document.

The operation panel controller 1905 sets the electronic watermark function ON/OFF parameter for each user who uses the multifunction product, and controls the screen display to differentiate the display of items of keys and buttons concerning the electronic watermark function for each user. Other hardware configurations and functions are similar to those of the multifunction product 100 according to the first embodiment.

The user DB 1931 stored in the HDD 1930 is explained next. The user DB 1931 has users who use the multifunction product 1900 registered in this database. FIG. 20 is an explanatory diagram of one example of the user DB 1931. As shown in FIG. 20, a user name, a password (an encrypted password is registered), authority, and name for each user are registered in the user DB 1931.

The authority indicates user's authority of using the multifunction product 1900. The authority becomes weak in the order of high, medium, and low.

The operation panel controller 1905 controls the screen display to differentiate a mode of a display screen of the electronic watermarking according to the determined authority.

The screen control processing of the operation panel by the multifunction product 1900 is explained next. Like the multifunction product 100 according to the first embodiment, the multifunction product 1900 controls the display on the main menu screen and the initialization screen to differentiate the display of items of keys and buttons concerning the electronic watermark function depending on whether the expansion board 120 is mounted on the multifunction product or depending on a value of the electronic watermark function ON/OFF parameter.

Like the multifunction product 1200 according to the second embodiment, the multifunction product 1900 controls the display on the distribution destination screen and the accumulated document screen to differentiate the display of items of keys and buttons concerning the electronic watermark function for each distribution destination and for each accumulated document depending on the value of the electronic watermark function ON/OFF parameter of the scanner distribution destination list 1231 and the scanner accumulated document list 1232.

In the third embodiment, the following screen display control is also carried out. When an embedded information setting button is touched in an electronic watermark setting menu shown in FIG. 7, an embedded information setting screen is displayed.

Figure 21:
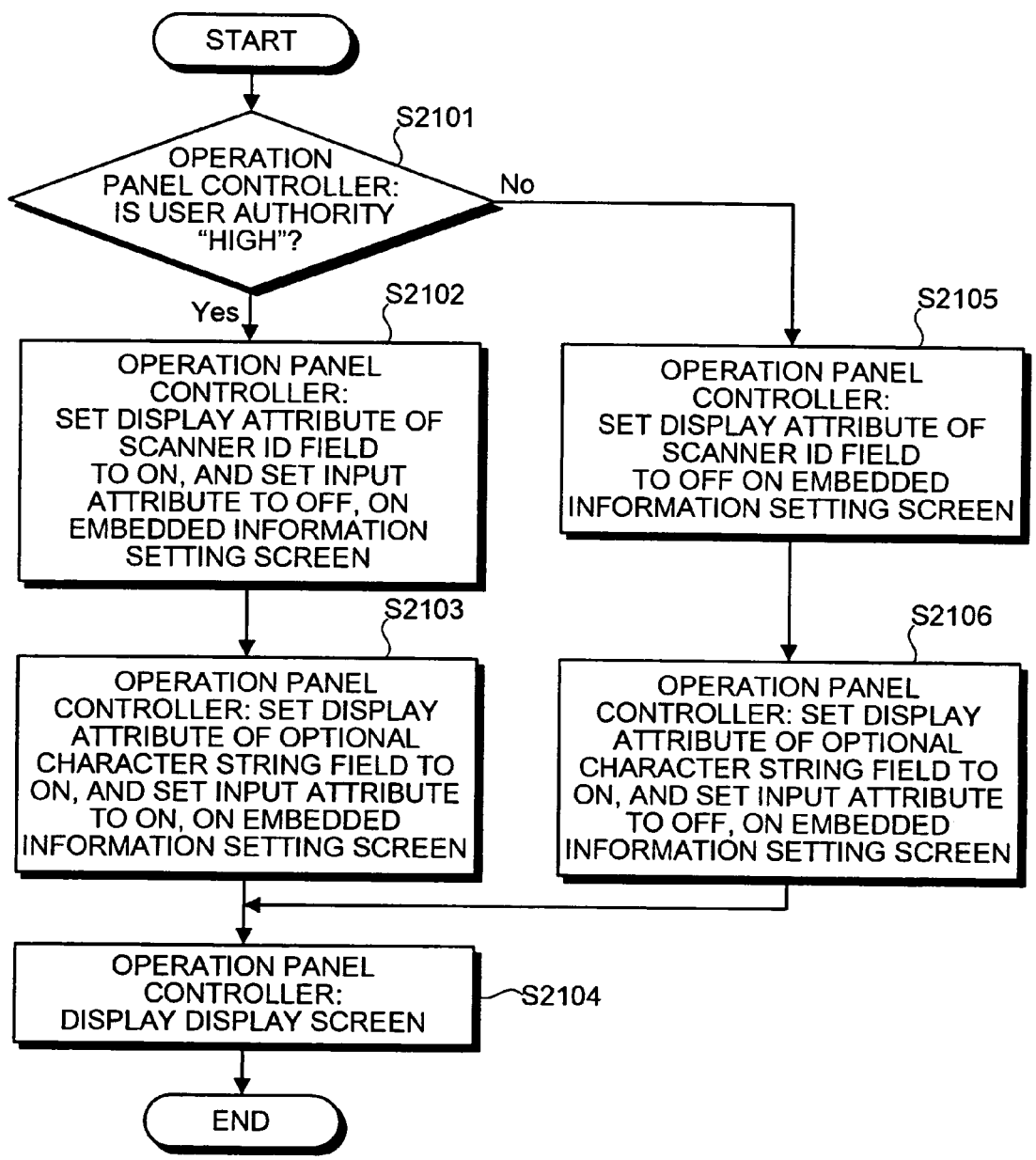
FIG. 21 is a flowchart of a sequence of a display control processing of an embedded information setting when an embedded information setting button is touch-input in the electronic watermark setting menu displayed on the operation panel of the multifunction product.

FIG. 21 is a flowchart of a sequence of the display control processing of the embedded information setting when the embedded information setting button is touch-input in the electronic watermark setting menu displayed on the operation panel 150 of the multifunction product 1200.

When the embedded information setting button is touch-input in the electronic watermark setting menu, the operation panel controller 1905 refers to the user DB 1931, and determines whether the authority of the user name of the operating user is high (step S2101).

When the authority is high (Yes at step S2101), the operation panel controller 1905 sets the display attribute of a scanner ID field on the embedded information setting screen to ON, and sets the input attribute to OFF (step S2102). The operation panel controller 1905 sets the display attribute of an optional character string field on the embedded information setting screen to ON, and sets the input attribute to ON (step S2103).

When the display attribute of a field on the screen is set to ON, the operation panel controller 1905 displays this field on the screen. When the display attribute of a field on the screen is set to OFF, the operation panel controller 1905 does not display this field on the screen.

When the input attribute of a field on the screen is set to ON, the operation panel controller 1905 can input data into the field displayed on the screen. When the input attribute of a field on the screen is set to OFF, the operation panel controller 1905 cannot input data into the field displayed on the screen.

On the other hand, when the authority is not high, or when the authority is medium or low at step S2101 (No at step S2101), the operation panel controller 1905 sets the display attribute of the scanner ID field on the embedded information setting screen to OFF (step S2105). Then, the operation panel controller 1905 sets the display attribute of the optional character string field on the embedded information setting screen to ON, and sets the input attribute to OFF (step S2106).

The operation panel controller 1905 displays the embedded information setting screen in which the field attribute is determined, in the display unit of the operation panel 150 (step S2104).

Figure 22A:
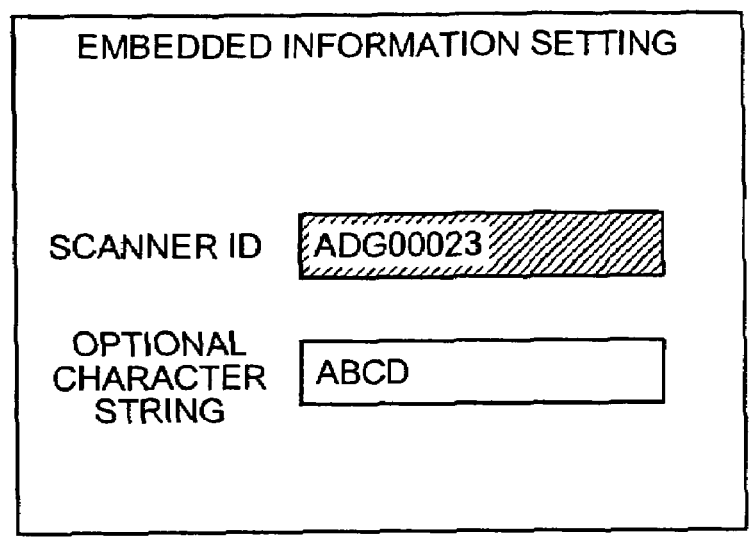
FIG. 22A is a schematic view of a display example of an embedded information setting screen when the authority of the user is high.

FIG. 22A is a schematic view of a display example of the embedded information setting screen when the authority of the user is high. When the user authority is high, the scanner ID field is displayed in a state that this scanner ID field cannot be input on the embedded information setting screen. The optional character string field is displayed in a state that this optional character string field can be read and data can be input to this field. Therefore, the user can recognize a value embedded in the scanner ID field in the image, but cannot change the embedded value. The user can understand a character string in the optional character string field embedded in the image, and can change the embedded character string on the character string field.

Figure 22B:
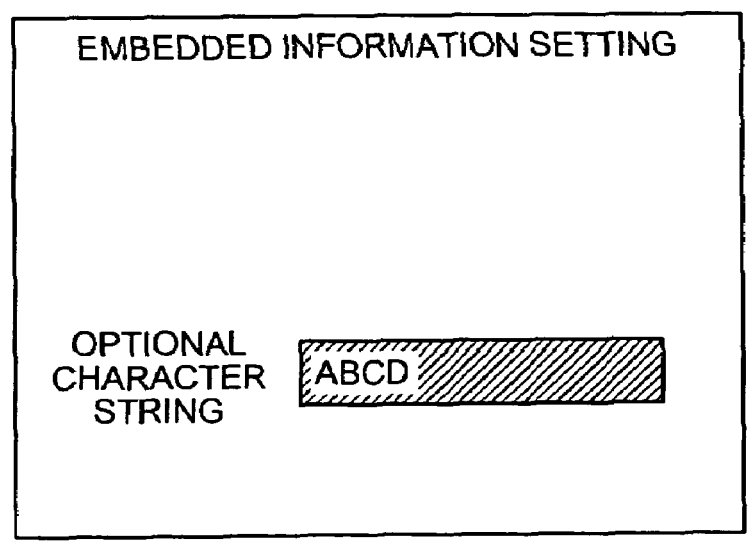
FIG. 22B is a schematic view of a display example of the embedded information setting screen when the authority of the user is medium or low.

FIG. 22B is a schematic view of a display example of the embedded information setting screen when the authority of the user is medium or low. When the authority is medium or low, the scanner ID field is not displayed on the embedded information setting screen. Therefore, the user cannot recognize that the scanner ID is embedded in the image. The optional character string field is displayed in a state that data cannot be input to this field. Therefore, the user can recognize that a displayed character string is embedded in the optional character string field in the image, but cannot change this character string. The user can understand the character string in the optional character string field embedded in the image, and can change the embedded character string on the character string field.

Figure 23:
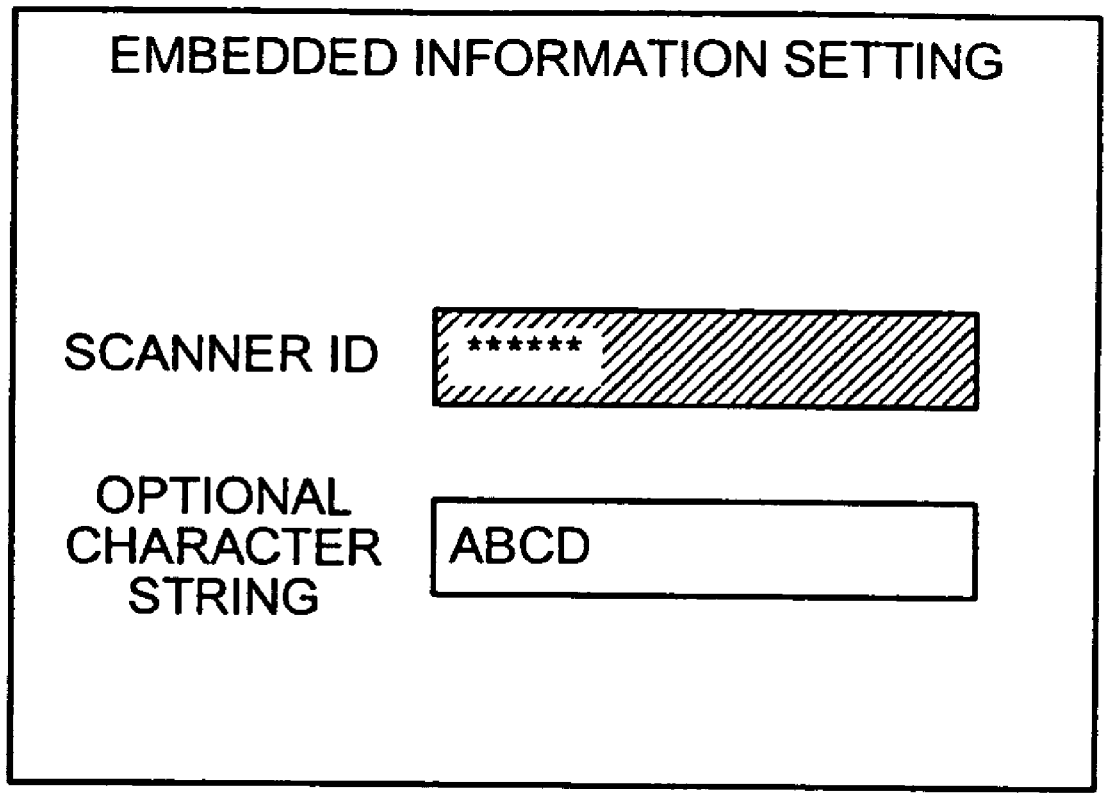
FIG. 23 is a schematic view of a display example of an embedded information setting screen in which a scanner identification field cannot be read and cannot be input.

According to the multifunction product 1900, while the operation panel controller 1905 displays the scanner ID field on the embedded information setting screen in a state that data can be input to this field, when the user authority is high, the scanner ID field can be displayed in a state that the user cannot read this field and cannot input data to this field. FIG. 23 is a schematic view of a display example of the embedded information setting screen in a state that the scanner ID field cannot be read and data cannot be input. As shown in FIG. 23, the value of the scanner ID field shown in the form of "*****" cannot be read. However, the user can understand that a certain value is embedded in the image based on the presence of the value in the scanner ID field.

As explained above, according to the third embodiment, when displaying a screen concerning the electronic watermark function on the operation panel for the user, the multifunction product 1900 outputs items concerning the electronic watermark function to the operation panel in a state that a display mode is different, the display can be read or cannot be read, data can be input or cannot be input, depending on the authority of the user. Therefore, the electronic watermark function has diversity.

While the electronic watermark function is taken as an example of the extended function in the first to the third embodiments, the extended function is not limited to this. The present invention can be also applied to a screen control of the extended function of other security functions or the extended function other than the security function.

While the display control of the electronic watermark function setting screen is mainly taken as an example in the first to the third embodiments, the present invention can be also applied to other screens concerning the electronic watermark function.

According to the present invention, because an appropriate screen can be displayed automatically, the operability of the device can be improved.

According to the present invention, when a detachable expansion board that realizes an extended function is mounted on the image forming apparatus, a display concerning the extended function is output to the operation panel. As a result, because an appropriate screen can be automatically displayed on the operation panel, the operability of the device can be improved.

According to the present invention, it is determined, at the time of executing an image formation processing, whether the detachable expansion board is mounted on the image forming apparatus. When the expansion board is mounted in displaying a screen concerning the image formation processing on the operation panel, a display concerning the extended function is output to the operation panel, thereby automatically determining whether the extended function is mounted at the stage of the image formation processing. Therefore, by automatically switching a screen display to the operation panel at the time of the image formation processing, the operability of the user in using the extended function can be improved.

According to the present invention, it is determined whether a detachable expansion board that realizes an extended function is mounted on the image forming apparatus, at the time of initialization processing. When it is determined that the expansion board is mounted in displaying a screen concerning the initialization on the operation panel, a display concerning the extended function is output to the operation panel, thereby automatically determining whether the extended function is mounted at the stage of the initialization processing. Therefore, by automatically switching a screen display to the operation panel at the time of the initialization processing, the operability of the user in using the extended function can be improved.

According to the present invention, when it is determined that the expansion board is mounted on the image forming apparatus and also when the use of the extended function is set to extended function permission information, a display concerning the extended function is output to the operation panel. With this arrangement, even when the expansion board is mounted, a screen display concerning the extended function on the operation panel can be automatically switched, depending on whether the user uses the extended function. Therefore, the operability of the user in using the extended function can be improved.

According to the present invention, by setting the extended function permission information at the initialization time, the user can determine whether to use the extended function at the initialization time. Therefore, the operability can be improved.

According to the present invention, by setting the extended function permission information at the time of executing the image formation processing, the user can determine whether to use the extended function even after the initialization processing. Therefore, the operability of the user in using the extended function can be further improved.

According to the present invention, the operation panel displays the distribution setting screen for making the user assign a distribution destination. When the use of the extended function is set to the extended function permission information included in the distribution destination information corresponding to the distribution destination assigned from the distribution setting screen, a display concerning the setting of the extended function is output to the operation panel. With this arrangement, whether to use the extended function can be changed for each distribution destination of the input image. Therefore, the extended function has diversity.

According to the present invention, the operation panel displays the accumulated document assignment screen for making the user assign document information stored in a document accumulating unit. When the use of the extended function is set to the extended function permission information included in the document accumulation information corresponding to the document information assigned from the accumulated document assignment screen, a display concerning the setting of the extended function is output to the operation panel. With this arrangement, whether to use the extended function can be changed for each piece of accumulated document information. Therefore, the extended function has diversity.

According to the present invention, at the time of displaying the extended function screen concerning the extended function on the operation panel for the user, items concerning the extended function are output to the operation panel in different display modes based on the authority of the user. With this arrangement, a display mode of the extended function can be changed based on the authority of the user. Therefore, the extended function has diversity.

According to the present invention, at the time of displaying the extended function screen concerning the extended function on the operation panel for the user, items concerning the extended function are output to the operation panel in such a display mode that the display cannot be read, based on the authority of the user. With this arrangement, the display mode of the extended function can be set such that the display cannot be read and only the fact that the extended function is used can be understood, based on the authority of the user. Therefore, the extended function has diversity.

According to the present invention, at the time of displaying the extended function screen concerning the extended function on the operation panel for the user, input items concerning the extended function are output to the operation panel in such a distinguished mode that the items can be input or cannot be input, based on the authority of the user. With this arrangement, the input items concerning the extended function can be displayed by changing a display mode between a mode in which the items can be input and a mode in which the items cannot be input, based on the authority of the user. Therefore, the extended function has more diversity.

According to the present invention, it is determined whether a detachable expansion board that realizes an electronic watermarking of embedding watermark information into an image is mounted as an extended function on the image forming apparatus. When it is determined that the expansion board is mounted, a display concerning the electronic watermarking is output to an operation panel, thereby automatically determining whether the electronic watermark function is mounted. Therefore, by automatically switching a screen display to the operation panel, the operability of the user in using the electronic watermark function can be improved.

According to the present invention, it is determined whether a detachable expansion board that realizes an extended function is mounted on the image forming apparatus. When it is determined that the expansion board is mounted, a display concerning the extended function is output to the operation panel, thereby automatically determining whether the extended function is mounted. Therefore, by automatically switching a screen display to the operation panel at the stage of the image formation processing, the operability of the user in using the extended function can be improved.

According to the present invention, when it is determined that the expansion board is mounted on the image forming apparatus and also when the use of the extended function is set to the extended function permission information, a display concerning the extended function is output to the operation panel. With this arrangement, even when the expansion board is mounted, a screen display concerning the extended function on the operation panel can be automatically switched, depending on whether the user uses the extended function. Therefore, the operability of the user in using the extended function can be improved.

According to the present invention, the operation panel displays the distribution setting screen for making the user assign a distribution destination. When the use of the extended function is set to the extended function permission information included in the distribution destination information corresponding to the distribution destination assigned from the distribution setting screen, a display concerning the setting of the extended function is output to the operation panel. With this arrangement, whether to use the extended function can be changed for each distribution destination of the input image. Therefore, the extended function has diversity.

According to the present invention, the operation panel displays the accumulated document assignment screen for making the user assign document information stored in the document accumulating unit. When the use of the extended function is set to the extended function permission information included in the document accumulation information corresponding to the document information assigned from the accumulated document assignment screen, a display concerning the setting of the extended function is output to the operation panel. With this arrangement, whether to use the extended function can be changed for each piece of accumulated document information. Therefore, the extended function has diversity.

According to the present invention, at the time of displaying the extended function screen concerning the extended function on the operation panel for the user, items concerning the extended function are output to the operation panel in different display modes based on the authority of the user. With this arrangement, a display mode of the extended function can be changed based on the authority of the user. Therefore, the extended function has diversity.

According to the present invention, at the time of displaying the extended function screen concerning the extended function on the operation panel for the user, items concerning the extended function are output to the operation panel in such a display mode that the display cannot be read, based on the authority of the user. With this arrangement, the display mode of the extended function can be set such that the display cannot be read and only the fact that the extended function is used can be understood, based on the authority of the user. Therefore, the extended function has diversity.

According to the present invention, at the time of displaying the extended function screen concerning the extended function on the operation panel for the user, input items concerning the extended function are output to the operation panel in such a mode that the items can be input or cannot be input, based on the authority of the user. With this arrangement, the input items concerning the extended function can be displayed by changing a display mode between a mode in which the items can be input and a mode in which the items cannot be input, based on the authority of the user. Therefore, the extended function has more diversity.

According to the present invention, it is determined whether a detachable expansion board that realizes an electronic watermarking of embedding watermark information into an image is mounted as an extended function on the image forming apparatus. When it is determined that the expansion board is mounted, a display concerning the electronic watermarking is output to the operation panel, thereby automatically determining whether the electronic watermark function is mounted. Therefore, by automatically switching a screen display to the operation panel, the operability of the user in using the electronic watermark function can be improved.

The present invention provides a program for making a computer execute any one of the methods according to the above aspects of the invention.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that carries out image formation, comprising:
    an operation panel that enables a user to carry out an input operation, and that carries out a screen display;
    an expansion board recognizing unit that determines whether a detachable expansion board that realizes a watermarking function is mounted on the image forming apparatus;
    an operation panel controller that outputs a display concerning the watermarking function on the operation panel when the expansion board recognizing unit determines that the expansion board is mounted;
    an extended function processor that sets extended function permission information indicating acceptance or non-acceptance of the use of the watermarking function to the user in advance;
    a distribution destination storage unit that stores distribution destination information to which a distribution destination of distributing an input image via a network and the extended function permission information are related, wherein
    the operation panel controller displays a distribution setting screen for enabling the user to assign the distribution destination on the operation panel and outputs the display concerning the setting of the watermarking function to the operation panel when the use of the watermarking function is set to the extended function permission information of the distribution destination information corresponding to the distribution destination assigned from the distribution setting screen, and
    the operation panel controller is configured to display a first watermark setting screen including both a scanner ID field and an optional character string field based on a retrieved first security level corresponding to a user name input to the operation panel, and display a second watermark setting screen including only the optional character string field based on a retrieved second security level corresponding to a user name input to the operation panel.

2. The image forming apparatus according to claim 1, wherein the optional character string displayed by the first watermark setting screen is able to be modified by an input to the operation panel, and the optional character string displayed by the second watermark setting screen is unable to be modified by an input to the operation panel.

3. An operation panel control method comprising:
    determining whether a detachable expansion board that realizes a watermarking function is mounted on an image forming apparatus;
    outputting a display concerning the watermarking function to an operation panel for enabling a user to carry out an input operation and for carrying out a screen display when it is determined at the determining that the expansion board is mounted;

setting extended function permission information indicating acceptance or non-acceptance of the use of the watermarking function to the user in advance;

displaying on the operation panel a distribution setting screen for enabling the user to assign a distribution destination of an input image to be distributed via a network;

outputting the display concerning the setting of the watermarking function when the use of the watermarking function is set to the extended function permission information of the distribution destination information, to which the distribution destination and the extended function permission information are related, corresponding to the distribution destination assigned from the distribution setting screen;

displaying a first watermark setting screen including both a scanner ID field and an optional character string field based on a retrieved first security level corresponding to a user name input to the operation panel; and displaying a second watermark setting screen including only the optional character string field based on a retrieved second security level corresponding to a user name input to the operation panel.

4. The operation panel control method according to claim 3, wherein the optional character string displayed by the first watermark setting screen is able to be modified by an input to the operation panel, and the optional character string displayed by the second watermark setting screen is unable to be modified by an input to the operation panel.

5. A computer-readable recording medium that stores therein a computer program for causing a computer to execute:

determining whether a detachable expansion board that realizes a watermarking function is mounted on an image forming apparatus;

outputting a display concerning the watermarking function to an operation panel for enabling a user to carry out an input operation and for carrying out a screen display when it is determined at the determining that the expansion board is mounted;

setting extended function permission information indicating acceptance or non-acceptance of the use of the watermarking function to the user in advance;

displaying on the operation panel a distribution setting screen for enabling the user to assign a distribution destination of an input image to be distributed via a network;

outputting the display concerning the setting of the watermarking function when the use of the watermarking function is set to the extended function permission information of the distribution destination information, to which the distribution destination and the extended function permission information are related, corresponding to the distribution destination assigned from the distribution setting screen;

displaying a first watermark setting screen including both a scanner ID field and an optional character string field based on a retrieved first security level corresponding to a user name input to the operation panel; and displaying a second watermark setting screen including only the optional character string field based on a retrieved second security level corresponding to a user name input to the operation panel.

6. The computer-readable medium according to claim 5, wherein the optional character string displayed by the first watermark setting screen is able to be modified by an input to the operation panel, and the optional character string displayed by the second watermark setting screen is unable to be modified by an input to the operation panel.

\* \* \* \* \*